(12) United States Patent
Fan

(10) Patent No.: US 8,824,157 B2
(45) Date of Patent: Sep. 2, 2014

(54) MOUNTING APPARATUS FOR EXPANSION CARDS

(75) Inventor: Chen-Lu Fan, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 144 days.

(21) Appl. No.: 13/469,304

(22) Filed: May 11, 2012

(65) Prior Publication Data

US 2013/0141882 A1 Jun. 6, 2013

(30) Foreign Application Priority Data

Dec. 2, 2011 (TW) .................................. 100144291

(51) Int. Cl.
*G06F 1/16* (2006.01)
(52) U.S. Cl.
USPC ............ 361/758; 248/674; 361/759; 361/740
(58) Field of Classification Search
USPC ..................... 361/759, 740, 747, 732; 174/50; 248/674
See application file for complete search history.

(56) References Cited

U.S. PATENT DOCUMENTS 5,847,923 A * 12/1998 Lee .............................. 361/679.4
6,885,550 B1 * 4/2005 Williams ................. 361/679.33
7,443,667 B2 * 10/2008 Guo et al. ................. 361/679.33

* cited by examiner

*Primary Examiner* — Jayprakash N Gandhi
*Assistant Examiner* — Mandeep Buttar
(74) *Attorney, Agent, or Firm* — Novak Druce Connolly Bove + Quigg LLP

(57) ABSTRACT

A mounting apparatus includes a chassis, an expansion piece attached to a first end of an expansion card, and a securing member. The chassis includes a bottom plate and a front plate substantially perpendicular to the bottom plate. The expansion piece is secured to the front plate. The securing member for securing a second opposite end of the expansion card and includes a first securing portion attached to the bottom plate and a second securing portion. The first securing portion includes a securing panel and a supporting tab extending from the securing panel for supporting the expansion card. The second securing portion includes a positioning post. The second securing portion is deformable in a direction away from the securing panel, and when the second securing portion is released, the positioning post is engaged in a retaining hole of the expansion card.

16 Claims, 5 Drawing Sheets

MOUNTING APPARATUS FOR EXPANSION CARDS

BACKGROUND

1. Technical Field

The present disclosure relates to mounting apparatuses, and particularly to a mounting apparatus for securing expansion cards in an electronic device.

2. Description of Related Art

Computer systems usually include multiple expansion cards, such as sound cards, video cards, graphics cards and so on, for enhancing capabilities of the computer system. Short expansion cards may be coupled to a riser card and are secured to a rear wall of a computer system enclosure only by one ends of the short expansion card. Expansion cards may be unstably mounted to the computer systems as described above. Therefore, there may be room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
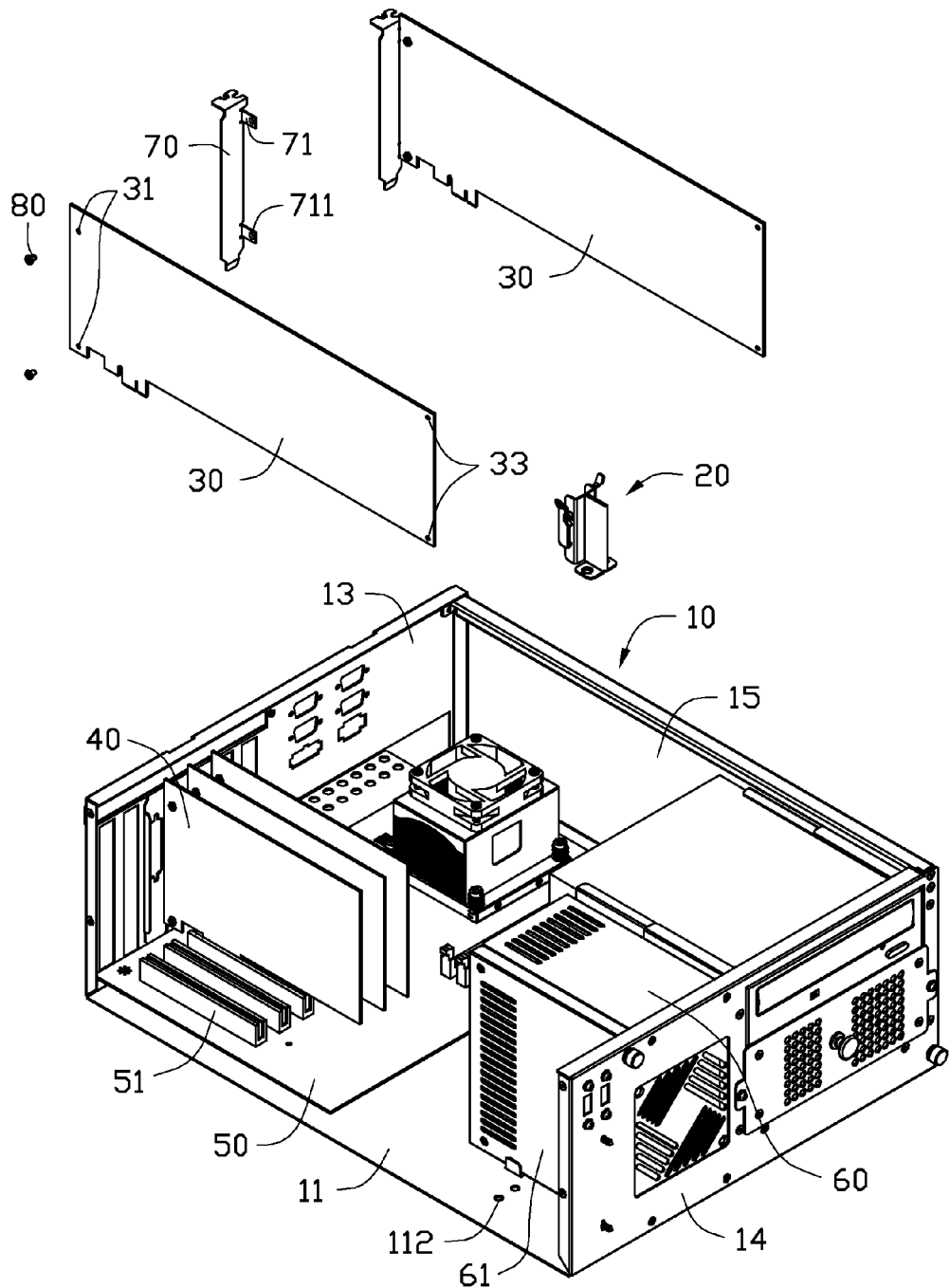
FIG. 1 is an exploded, isometric view of a mounting apparatus for an expansion card in accordance with an embodiment.
Figure 2:
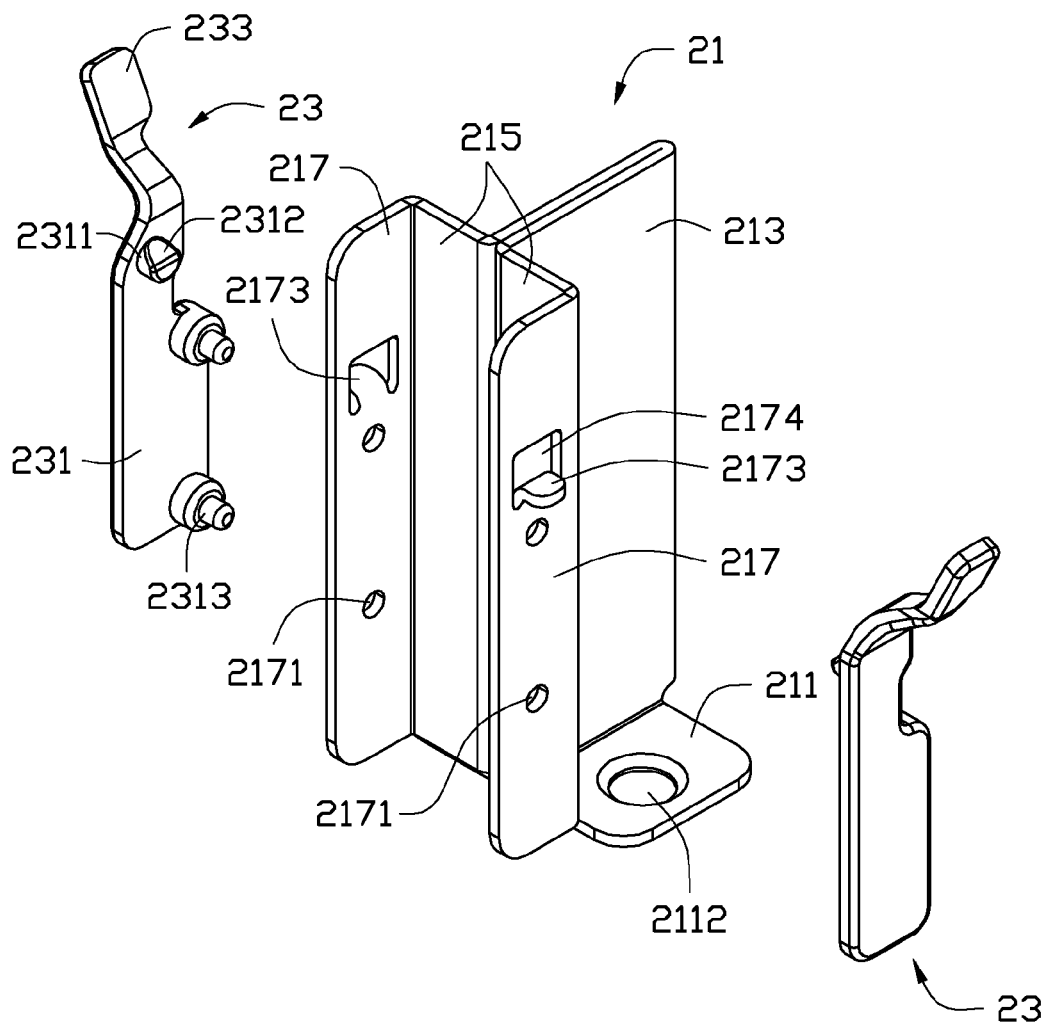
FIG. 2 is an exploded, isometric view of a securing member of the mounting apparatus of FIG. 1.
Figure 3:
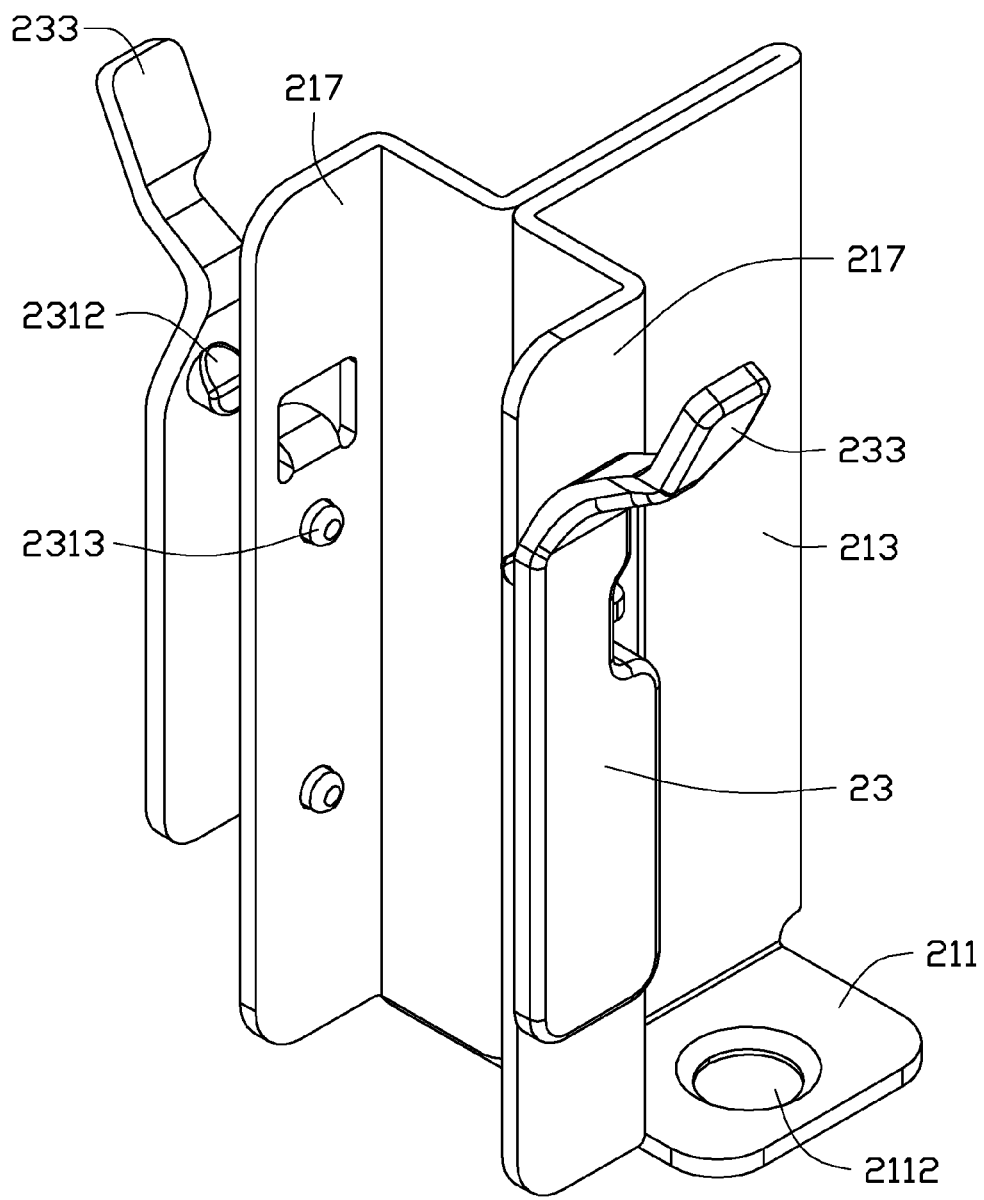
FIG. 3 is an assembled view of the mounting apparatus of FIG. 2.

Referring to FIGS. 1 to 3, a mounting apparatus in accordance with an embodiment is configured for securing two first expansion cards 30 and three second expansion cards 40. The mounting apparatus includes a chassis 10 and a securing member 20. The first and the second expansion cards 30, 40 may be, for example, sound cards, video cards, graphics cards, or other peripheral component interconnection cards. In one embodiment, a length of each of the two first expansion cards 30 is greater than a length of each of the three second expansion cards 40.

The chassis 10 includes a bottom plate 11, a front plate 13, a rear plate 14, and two side plates 15 (only one is shown). In one embodiment, the bottom plate 11 is substantially perpendicular to each of the two side plates 15 and the front plate 13, and the front plate 13 is parallel to the rear plate 14. A motherboard 50 and a power supply 60 are attached to the bottom plate 11. The motherboard 50 is adjacent to the front plate 13, and the power supply 60 is adjacent to the rear plate 14. A plurality of inserting slots 51 are defined in the motherboard 50. The power supply 60 includes a side panel 61 substantially perpendicular to the rear plate 14. Two mounting holes 112, adjacent to the side panel 61, are defined in the bottom plate 11. In one embodiment, the two mounting holes 112 are arranged in a straight line that is substantially perpendicular to the side panel 61.

The securing member 20 includes a first securing portion 21, and two second securing portions 23 attached to opposite sides of the first securing portion 21. The first securing portion 21 includes a base 211, a positioning panel 213 connected to the base 211, two connecting panels 215 connected to the positioning panel 213, and two securing panels 217 connected to the two connecting panels 215. In one embodiment, the positioning panel 213 is substantially perpendicular to the base 211, the positioning panel 213 includes two parts that are adhered to each other, and each of the two connecting panels 215 is connected to each of the two parts of the positioning panel 213. In one embodiment, the two connecting panels 215 are located at a same plane, which is substantially perpendicular to the positioning panel 213. Each of the two securing panels 217 is substantially perpendicular to each of the two connecting panels 215.

Two securing holes 2112, corresponding to the two mounting holes 112, are defined in the base 211. In one embodiment, the two mounting holes 112 are separated by the positioning panel 213. Two receiving holes 2171 are defined in each of the two securing panels 217, and a supporting tab 2173 is located on the two receiving holes 2171. In one embodiment, the supporting tab 2173 is substantially perpendicular to the securing panel 217. An opening 2174 is defined in each of the two securing panels 217, and the supporting tab 2173 extends from an edge of the opening 2174.

Each of the two second securing portion 23 includes a securing board 231 and an operating portion 233 extending from the securing board 231. A positioning post 2311 and two engaging posts 2313 are located on the securing board 231. The positioning post 2311 defines a slanted surface 2312. In one embodiment, the positioning post 2311 and the two engaging posts 2313 are located on a same side of the securing board 231.

Two first retaining holes 31 and two second retaining holes 33 are defined in each of the two first expansion cards 30. The two first retaining holes 31 are located on a first end of each of the two first expansion cards 30, and the two second retaining holes 33 are located on a second end of each of the two first expansion cards 30. An expansion piece 70 is attached to each of the two first expansion cards 30. Two mounting tabs 71, each with a fixing hole 711, and extending from an edge of the expansion piece 70. In one embodiment, the expansion piece 70 can be secured to the front plate 13 by known means, such as screws or clamp.

Figure 4:
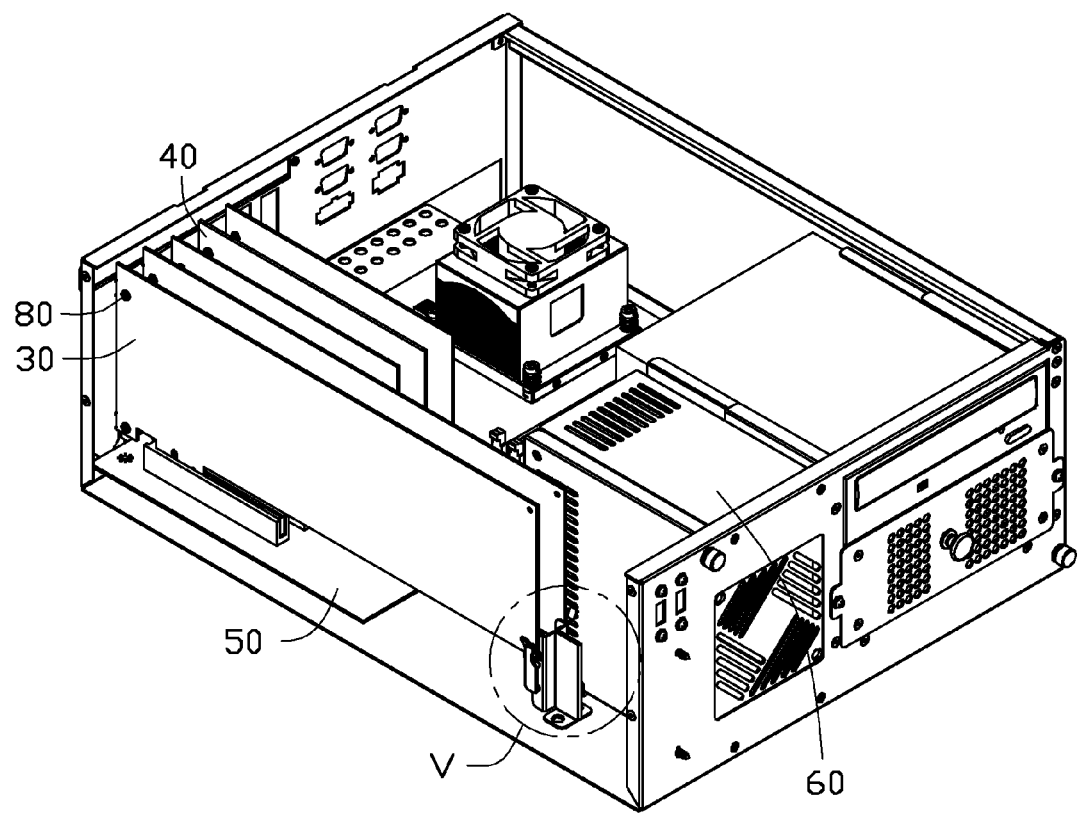
FIG. 4 is an assembled view of the mounting apparatus for the expansion card of FIG. 1.
Figure 5:
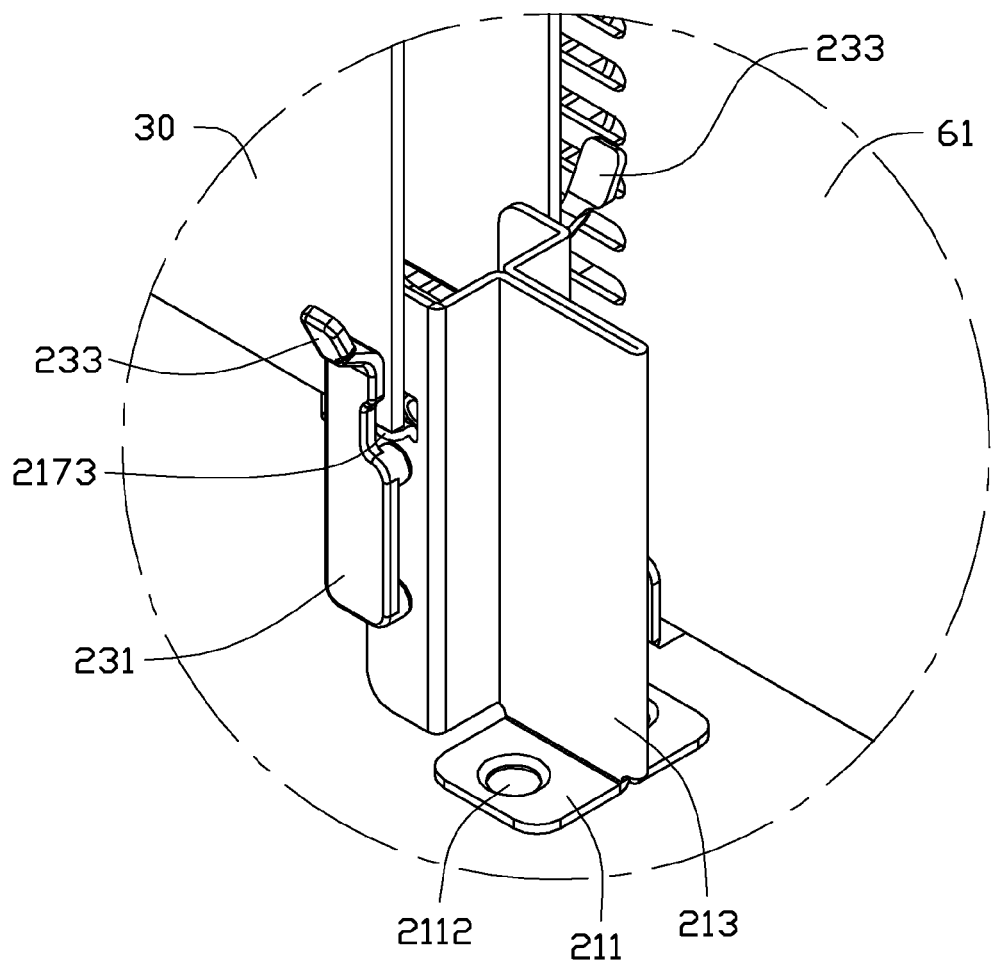
FIG. 5 is an enlarged view of circled portion V of FIG. 4.

Referring to FIGS. 3-5, in assembly, the two engaging posts 2313 of each of the two second securing portion 23 are engaged in the two receiving holes 2171 of each of the two securing panels 217, to secure each of the second securing portion 23 to each of the two securing panels 217.

The securing member 20 is placed on the bottom plate 11, and the two mounting holes 112 are aligned with the two securing holes 2112. Two mounting members (not shown) are engaged in the two mounting holes 112 and the two securing holes 2112, to secure the base 211 to the bottom plate 11. In one embodiment, the two mounting holes 112 can be engaged with the two securing holes 2112 by jointing.

The expansion piece 70 is secured to the front plate 13. The operating portion 233 is operated to deform the second securing portion 23 in a direction away from the securing panel 217. The first expansion card 30 is inserted into the inserting slot 51. The second end of the first expansion card 30 is sandwiched between the securing board 231 and the securing panel 217, and the second end of the first expansion card 30 is further supported by the supporting tab 2173. The second securing portion 23 is released, and the positioning post 2311 is engaged in the two second retaining holes 33. Each of the two first retaining holes 31 is aligned with each of the two fixing holes 711. Two fixing members 80 are engaged in the two first retaining holes 31 and the two fixing holes 711, and the assembly is completed.

In disassembly, the two fixing members 80 are removed from the two retaining holes 31 and the two fixing holes 711. The operating portion 233 is operated to deform the second securing portion 23 in a direction away from the securing panel 217, to disengage the positioning post 2311 from the two second retaining holes 33. The first expansion card 30 is removed from the inserting slot 51, and the first expansion card 30 can be detached from the chassis 10. In one embodiment, the slanted surface 2312 is used to guide the positioning post 2311 to engage in the two second retaining holes 33 or disengage from the two second retaining holes 33.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a chassis comprising a bottom plate and a front plate substantially perpendicular to the bottom plate;
   an expansion piece attached to a first end of an expansion card, and secured to the front plate;
   a securing member adapted for securing a second end opposite to the first end of the expansion card, comprising a first securing portion and a second securing portion, the first securing portion comprising a securing panel, and a supporting tab adapted for supporting the expansion card, the supporting tab being extended from the securing panel; the second securing portion comprising a positioning post;
   wherein the first securing portion is attached to the bottom plate the positioning post is engaged in a retaining hole of the expansion card, to sandwich the expansion card between the securing panel and the second securing portion; and the second securing portion is deformable in a direction away from the securing panel to disengage the positioning post from the retaining hole of the expansion card.

2. The mounting apparatus of claim 1, wherein the positioning post comprises a slanted surface adapted for guiding the positioning post to engage in the retaining hole.

3. The mounting apparatus of claim 1, wherein the securing panel defines an opening, and the supporting tab extends from an edge of the opening.

4. The mounting apparatus of claim 1, wherein the first securing portion further comprises a base attached to the bottom plate and a positioning panel substantially perpendicular to the base, and the securing panel is substantially parallel to the positioning panel.

5. The mounting apparatus of claim 4, wherein the first securing portion further comprises a connecting panel, and the connecting panel is substantially perpendicularly connected to the positioning panel and the securing panel.

6. The mounting apparatus of claim 4, wherein the positioning panel is folded to two parts, and the two parts are adhered to each other.

7. The mounting apparatus of claim 1, wherein the second securing portion comprises a securing board substantially parallel to the securing panel, and the positioning post is located on the securing board.

8. The mounting apparatus of claim 7, wherein the second securing portion further comprises an operating portion extending from the securing board, and the operating portion is adapted to deform the second securing portion.

9. A mounting apparatus comprising:
   a chassis comprising a bottom plate and a front plate substantially perpendicular to the bottom plate; an expansion piece attached to a first end of an expansion card, and secured to the front plate;
   a securing member, adapted for securing a second end opposite to the first end of the expansion card, comprising a first securing portion and a second securing portion; wherein the first securing portion is attached to the bottom plate and comprises a securing panel and a supporting tab extending from the securing panel; the second securing portion is attached to the securing panel and comprises a positioning post engaged in a retaining hole of the expansion card;
   wherein the supporting tab is located between the securing panel and the second securing portion, and adapted for supporting the second end of the expansion card, and the securing panel and the second securing portion together sandwich the second end of the expansion card therebetween; the second securing portion is deformable in a direction away from the securing panel thereby disengaging the positioning post from the retaining hole of the expansion card.

10. The mounting apparatus of claim 9, wherein the positioning post comprises a slanted surface adapted for guiding the positioning post to engage in the retaining hole.

11. The mounting apparatus of claim 9, wherein the securing panel defines an opening, and the supporting tab extends from an edge of the opening.

12. The mounting apparatus of claim 9, wherein the first securing portion further comprises a base attached to the bottom plate and a positioning panel substantially perpendicular to the base, and the securing panel is substantially parallel to the positioning panel.

13. The mounting apparatus of claim 12, wherein the first securing portion further comprises a connecting panel, and the connecting panel is substantially perpendicularly connected to the positioning panel and the securing panel.

14. The mounting apparatus of claim 12, wherein the positioning panel is folded to two parts, and the two parts are adhered to each other.

15. The mounting apparatus of claim 9, wherein the second securing portion comprises a securing board substantially parallel to the securing panel, and the positioning post is located on the securing board.

16. The mounting apparatus of claim 15, wherein the second securing portion further comprises an operating portion extending from the securing board, and the operating portion is adapted to deform the second securing portion.

* * * * *